United States Patent
Müller et al.

(10) Patent No.: US 10,761,261 B2
(45) Date of Patent: Sep. 1, 2020

(54) LIGHT GUIDE CLAMPING DEVICE, FIBER OPTIC SENSOR AND PRODUCTION METHOD

(71) Applicant: FOS4X GMBH, Munich (DE)

(72) Inventors: Mathias Müller, Munich (DE); Fabian Zelenka, Munich (DE)

(73) Assignee: fos4X GmbH, Munich (DE)

( * ) Notice: Subject to any disclaimer, the term of this patent is extended or adjusted under 35 U.S.C. 154(b) by 129 days.

(21) Appl. No.: 15/761,147

(22) PCT Filed: Sep. 20, 2016

(86) PCT No.: PCT/EP2016/072309
§ 371 (c)(1),
(2) Date: Mar. 19, 2018

(87) PCT Pub. No.: WO2017/050767
PCT Pub. Date: Mar. 30, 2017

(65) Prior Publication Data
US 2018/0274909 A1    Sep. 27, 2018

(30) Foreign Application Priority Data
Sep. 21, 2015    (DE) .................... 10 2015 115 925

(51) Int. Cl.
*G02B 6/02*    (2006.01)
*G01D 5/353*    (2006.01)
(Continued)

(52) U.S. Cl.
CPC ......... *G02B 6/0218* (2013.01); *G01B 5/0002* (2013.01); *G01B 11/165* (2013.01);
(Continued)

(58) Field of Classification Search
CPC .... G01B 11/165; G01B 5/0002; G01B 11/18; G02B 6/3616; G02B 6/0218; G02B 6/022;
(Continued)

(56) References Cited

U.S. PATENT DOCUMENTS 5,372,044 A    12/1994    Pierre et al.
5,694,503 A    12/1997    Fleming et al.
(Continued)

FOREIGN PATENT DOCUMENTS

CN    1250516 A    4/2000
CN    101298980 A    11/2008
(Continued)

OTHER PUBLICATIONS

Chinese Search Report with English translation for Patent Application No. 2016800543768 dated Nov. 23, 2019.
(Continued)

*Primary Examiner* — Que Tan Le
*Assistant Examiner* — Jennifer D Bennett
(74) *Attorney, Agent, or Firm* — Moser Taboada

(57) ABSTRACT

A clamping device (300) for a light guide (112) is provided. The clamping device (300) includes a carrier structure having a first securing element (301) for securing the light guide (112) in a first position (401), and a second securing element (302) at a distance from the first securing element (301) for securing the light guide (112) in a second position (402), wherein the first and second positions (401, 402) have a first distance (403) in a longitudinal extension of the light guide (112). Further, an intermediate carrier (500) having a first surface (503) on which the first and second securing elements (301, 302) are attached in respective securing positions (501, 502), and an opposing second surface (504), which can be applied to a measurement object, is provided.

(Continued)

Hereby, a second distance (505) of the securing positions (501, 502) of the securing elements (301, 302) on the intermediate carrier (500) is greater than the first distance (403) in a longitudinal direction of the light guide (112).

19 Claims, 6 Drawing Sheets

(51) Int. Cl.
    *G01B 11/16*     (2006.01)
    *G01B 5/00*     (2006.01)
    *G02B 6/36*     (2006.01)

(52) U.S. Cl.
    CPC .......... *G01B 11/18* (2013.01); *G01D 5/35316* (2013.01); *G02B 6/3616* (2013.01)

(58) Field of Classification Search
    CPC ... G01D 5/35316; G01M 5/0091; G01L 1/246
    See application file for complete search history.

(56) References Cited

U.S. PATENT DOCUMENTS

| | | | |
|---|---|---|---|
| 6,393,181 | B1 | 5/2002 | Bulman et al. |
| 6,510,272 | B1 | 1/2003 | Wiegand |
| 2002/0172462 | A1* | 11/2002 | Tao ....................... G02F 1/0134 |
| | | | 385/37 |
| 2006/0285813 | A1* | 12/2006 | Ferguson ................ G01B 11/16 |
| | | | 385/138 |
| 2007/0107529 | A1 | 5/2007 | Maurin |
| 2007/0193362 | A1* | 8/2007 | Ferguson ............. G01B 11/165 |
| | | | 73/800 |
| 2012/0132008 | A1 | 5/2012 | Way et al. |
| 2016/0356661 | A1* | 12/2016 | Glueck ................. B61L 23/042 |

FOREIGN PATENT DOCUMENTS

| | | |
|---|---|---|
| DE | 4332807 A1 | 4/1994 |
| DE | 4446760 A1 | 6/1996 |
| DE | 19922102 A1 | 12/2000 |
| DE | 102011083028 A1 | 3/2013 |
| EP | 1679497 A1 | 7/2006 |
| EP | 2295946 A1 | 3/2011 |
| JP | 2002317451 A | 10/2002 |
| JP | 2003287435 A | 10/2003 |
| WO | WO-0135133 A1 | 5/2001 |

OTHER PUBLICATIONS

Chinese First Office action with English translation for Patent Application No. 201680054376.8 dated Dec. 4, 2019.

German Examination Report dated Apr. 27, 2016 for Application No. 10 2015 115 925.2.

International Search Report and Written Opinion dated Dec. 15, 2016 for PCT Application No. PCT/EP2016/072309.

* cited by examiner

LIGHT GUIDE CLAMPING DEVICE, FIBER OPTIC SENSOR AND PRODUCTION METHOD

TECHNICAL FIELD

Embodiments of the present invention generally concern fiber optic sensors, and concern in particular a clamping device for a light guide which includes a fiber optic sensor. Embodiments of the present invention further concern a fiber optic sensor for measuring elongations and/or compressions, as well as a method for producing a fiber optic sensor.

BACKGROUND ART

Fiber sensors are in general designed as measuring devices in which a measured parameter is optically detected by means of an optical radiation transmitted by a light guide. Fiber sensors may in this case be designed as extrinsic sensors in which the light guide merely serves to transport the optical radiation. The design of fiber optic sensors as intrinsic sensors is further widely spread, in which the sensor element such as a fiber Bragg grating (FBG), for example, is contained in the sensor fiber itself. Due to the optical transmission of the measured parameter via the light guide, the fiber optic sensors are substantially insusceptible to external influences such as electromagnetic fields. Furthermore, fiber optic sensors exhibit good electromagnetic compatibility (EMC).

An intrinsic fiber optic sensor is sensitive to mechanical structural changes such as, for instance elongation and/or compression, as well as to temperature variations. For measuring a parameter to be detected, the sensor or the fiber optic sensor element is appropriately connected to a measurement object such as, for instance a rotor blade of a wind turbine, wherein undesired influences need to be compensated and measuring sensitivities be set. It is therefore desirable to further improve fiber optic sensors.

SUMMARY OF THE INVENTION

According to an embodiment, a clamping device for a light guide is provided. The clamping device contains a carrier structure having a first securing element for securing the light guide in a first position, and a second securing element at a distance from the first securing element for securing the light guide in a second position, wherein the first and second positions have a first distance in a longitudinal elongation of the light guide, and an intermediate carrier having a first surface on which the first and second securing elements are attached at respective securing positions, and having an opposing second surface, which can be applied to a measurement object, wherein a second distance of the securing positions of the securing elements on the intermediate carrier is greater than the first distance in a longitudinal direction of the light guide.

According to a further embodiment, as sensor for measuring elongations and/or compressions of a measurement object to be monitored is provided. The sensor includes a light guide having a fiber Bragg grating, wherein the light guide is clamped in a clamping device. The clamping device contains a carrier structure having a first securing element for securing the light guide in a first position, and a second securing element at a distance from the first securing element for securing the light guide in a second position, wherein the first and second positions have a first distance in a longitudinal elongation of the light guide, and an intermediate carrier having a first surface on which the first and second securing elements are attached at respective securing positions, and having an opposing second surface, which can be applied to a measurement object, wherein a second distance of the securing positions of the securing elements on the intermediate carrier is greater than the first distance in a longitudinal direction of the light guide.

According to an even further embodiment, a method for producing a sensor for measuring elongations and/or compressions of a measurement object to be monitored is provided, including the operations of: providing a carrier structure having a first and a second securing element, laying a light guide between the first and second securing elements, securing the light guide to the securing elements, pretensioning the light guide by means of an elastic element arranged between the securing elements, and attaching the carrier structure to an intermediate carrier.

BRIEF DESCRIPTION OF THE DRAWINGS

Exemplary embodiments are illustrated in the drawings and explained in more detail in the following description.

In the drawings, identical reference numerals designate identical or functionally identical components or blocks.

WAYS TO CARRY OUT THE INVENTION

Figure 1:
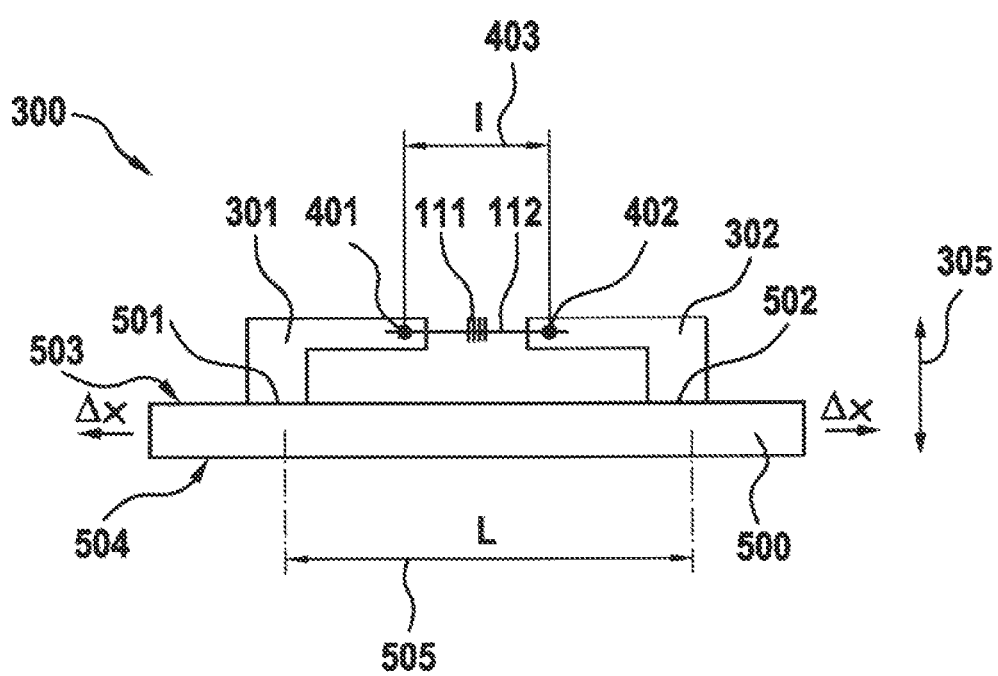
FIG. 1 schematically shows a clamping device for a light guide in a side view according to one embodiment.

Hereinafter, detailed reference is made to various embodiments of the invention, with one or more examples being illustrated in the drawings.

FIG. 1 schematically shows a clamping device 300 for a light guide 112 in a side view, according to one embodiment. The clamping device 300 includes a carrier structure which has a first securing element 301 for securing the light guide 112 in a first position 401, and a second securing element 302 at a distance from the first securing element 301 for securing the light guide 112 in a second position 401. Between the two positions 401, 402, the light guide 112 includes a sensor element 111. According to an embodiment which can be combined with other embodiments described herein, the sensor element 111 is configured as a fiber Bragg grating. The carrier structure of the clamping device 300 is in particular configured for receiving a light guide 112, which includes at least one fiber Bragg grating that can be positioned between the securing elements 301, 302. It should be noted that the sensor element 111 is arranged within the light guide 112 in the form of an intrinsic sensor and is not shown true to scale in FIG. 1.

According to an embodiment which can be combined with other embodiments described herein, the carrier structure may contain a material which is selected from the group consisting of CFRP, GFRP, steel, aluminum, plastics, an alloy or any combination thereof.

According to an embodiment which can be combined with other embodiments described herein, at least one of the securing elements 301, 302 includes a recess for inserting and fixing the light guide 112. According to another embodiment, the light guide 112 is adhesively bonded to the securing elements 301, 301 at the securing positions 401, 402.

The first and second positions 401, 402, where the light guide 112 is attached to the first securing element 301 and the second securing element 302, respectively, have a first distance 403 in a longitudinal elongation of the light guide 112. Furthermore, an intermediate carrier 500 having a first surface 503, to which the first and second securing elements 301, 302 are attached at respective securing positions 501, 502, and an opposing second surface 504 is provided, which can be attached to a measurement object (not shown).

According to a further embodiment which can be combined with embodiments described herein, the carrier structure is realized from a metallic material. According to an even further embodiment, the intermediate carrier 500 is realized from GFRP or CFRP. A material combination of the material of the intermediate carrier 500 and the material of the securing elements 301, 302 may be selected so as to achieve a temperature compensation. According to an even further embodiment which can be combined with other embodiments described herein, the first distance 403, the second distance 505, a material of the carrier structure and a material of the intermediate carrier 500 are selected such that a passive temperature compensation is provided for a fiber optic sensor 110 secured to the carrier structure.

Furthermore, it is possible for the thermal expansion coefficient of the carrier structure and the thermal expansion coefficient of the intermediate carrier 500 to be configured or adapted to one another such that the passive temperature compensation is provided for a fiber optic sensor 110 secured to the carrier structure. In this way, the advantage of compensating a thermal expansion of the intermediate carrier 500 at least in part by a thermal expansion of the carrier structure is achieved. In other words, a temperature compensation is provided by an embodiment which can be combined with other embodiments described herein, which results in the first distance 403 remaining substantially constant upon a change in temperature.

Although only a single sensor element 111 is shown in FIG. 1, it should be understood that the present invention is not restricted to a data acquisition from a single sensor element 111, but that a plurality of sensor elements 111 may be arranged along the light guide 112. FIG. 1 thus shows only a portion of the optical waveguide which may be formed as a sensor fiber, optical fiber or light guide 112. Such a sensor element 111 is sensitive to a fiber elongation and/or a fiber compression (see arrows Δx in FIG. 1) for instance. Optical radiation entering the light guide 112 thus is reflected from the sensor element 111 at a changed course of wavelength. Such a changed course of wavelength is determined by the mechanical load of the sensor element 111 as well as by temperature effects.

According to an embodiment which can be combined with other embodiments described herein, the second distance 505 of the securing positions 501, 502 of the securing elements 301, 302 on the intermediate carrier 500 is greater than the first distance 403 in a longitudinal direction of the light guide 112. In this way, a converter structure is provided which has a mechanical signal amplification arrangement that is free from lever action. Such a signal amplification will be explained in the following with reference to FIG. 1. It should be assumed that the intermediate carrier 500 mounted to a measurement object expands together with the measurement object in a direction shown by arrows Δx. In this case, the relative change in length E of the intermediate carrier 500 in relation to the second distance 505 or L, respectively, is given by the following equation:

$$E = \Delta x / L \tag{1}$$

The sensor element 111 moreover expands together with the light guide 112 between the first position 401 and the second position 402 at a relative change of length ε according to the following equation:

$$\varepsilon = \Delta x / I \tag{2}$$

Using the above equations (1) and (2), the relative elongation ε detected by the sensor element 111 results in:

$$\varepsilon = E(L/I) \tag{3}$$

In this way, the relative elongation applied to the measurement object is increased by the factor (UI) so that a signal amplification or a mechanical signal amplification arrangement without any lever action is provided by such a converter structure. This means that the relative change in length ε applied to the sensor element 111 is greater than the relative change in length E applied to the intermediate carrier 500. This enables the measuring resolution to be considerably improved. It should be pointed out that the signal amplification described above is also applicable vice versa to compressions of the intermediate carrier 500 by the measurement object. In particular, the securing elements 301, 302 together with the intermediate carrier 500 form a converter structure which has a mechanical signal amplification arrangement free from lever action and which can be set on the basis of the variables I and L.

According to a further embodiment which can be combined with other embodiments described herein, the converter structure having the set mechanical signal amplification arrangement free from lever action may be configured such that a passive temperature compensation will ensue together with the thermal expansion coefficients of the materials of the carrier structure in particular when the clamping device 300 is applied to the measurement object to be monitored.

According to a further embodiment which can be combined with other embodiments described herein, a sensor fiber or the light guide 112 may be led away relative to the longitudinal direction of the light guide 112 at an angle to an evaluating unit (not shown in FIG. 1). In particular, a unilateral lead-away of the light guide 112 may be performed via a robust cable. In order to avoid reflections at the other end of the light guide 112, a terminator may be provided that is mounted at a side of the sensor element 111 opposite the lead-away.

By providing the intermediate carrier 500 with the option of an extensive application to a measurement object to be monitored, the object elongation thereof is averaged over a larger range. This has the advantage that discontinuities in the material of the measurement object can be compensated. Furthermore, it is simply possible to apply the intermediate carrier 500 together with the entire sensor 110 to the measurement object by adhesive bonding.

Depending on the design of the intermediate carrier 500 and/or of the first and second securing elements 301, 302, an adjustable sensor height 305 will be obtained. According to a further embodiment which can be combined with embodiments described herein, the mounting of the carrier structure to the intermediate carrier 500 and/or the mounting of the intermediate carrier 500 to the measurement object to be monitored may be performed by adhering, soldering, bonding or laser welding.

In order to be able of mounting a fiber optic sensor, which is arranged in a clamping device 300 as shown in FIG. 1, particularly easily for instance on a rotor blade of a wind turbine, it is advantageous for the fiber optic sensor to have a small dimension 305 in a cross-section perpendicular to the light guide 112 in FIG. 1. A maximum dimension 305 in a cross-section perpendicular to the axis of the light guide 112 may be 10 mm or less, for example, and may in particular be 5 mm or less. The configuration shown with respect to FIG. 1 allows such a dimensioning to be realized in a simple manner.

For producing a sensor as shown in FIG. 1 for measuring elongations and/or compressions of a measurement object to be monitored, the following operations are substantially required: providing a carrier structure having a first and a second securing element 301, 302, laying a light guide 112 between the first and second securing elements 301, 302, securing the light guide 112 to the securing elements 301, 302, pretensioning the light guide 112 by means of an elastic element 506 arranged between the securing elements 301, 302, and attaching the carrier structure to an intermediate carrier 500.

Figure 2:
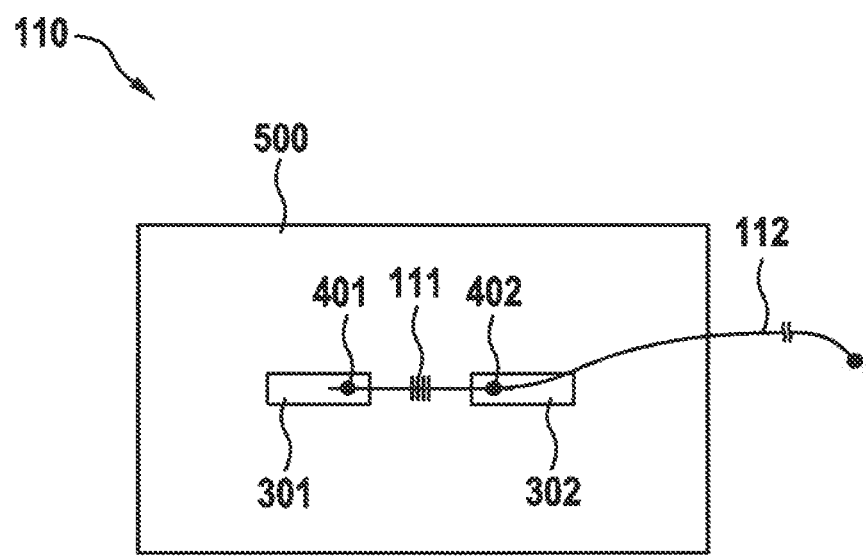
FIG. 2 shows a fiber optic sensor for measuring elongations and/or compressions of a measurement object to be monitored, according to one embodiment.

FIG. 2 shows a fiber optic sensor 110 for measuring elongations and/or compressions of a measurement object to be monitored. The sensor 110 includes a light guide 112 having a fiber Bragg grating 111, wherein the light guide 112 is clamped in a clamping device 300 illustrated in FIG. 1. The clamping device 300 illustrated in FIG. 1 is shown in a top view. At least one end of the light guide 112 will be connected to an evaluating unit described further below with reference to FIG. 6 for measuring elongations and/or compressions. It should be pointed out that, apart from an evaluation of the light reflected by the sensor element 111, the light transmitted through the sensor element 111 may be analyzed in the evaluating unit.

In order to provide a fiber optic sensor as illustrated in FIG. 1, for example, in a particularly easy manner on a rotor blade, in particular in an outer radial area, it is advantageous for the fiber optic sensor to have a small dimension 305 in a cross-section perpendicular to the light guide 112 in FIG. 1. A maximum dimension 305 in a cross-section perpendicular to the axis of the light guide 112 may be 10 mm or less, for example, and may in particular be 5 mm or less. The configuration shown with respect to FIG. 1 allows such a dimensioning to be realized in a simple manner.

Figure 3A:
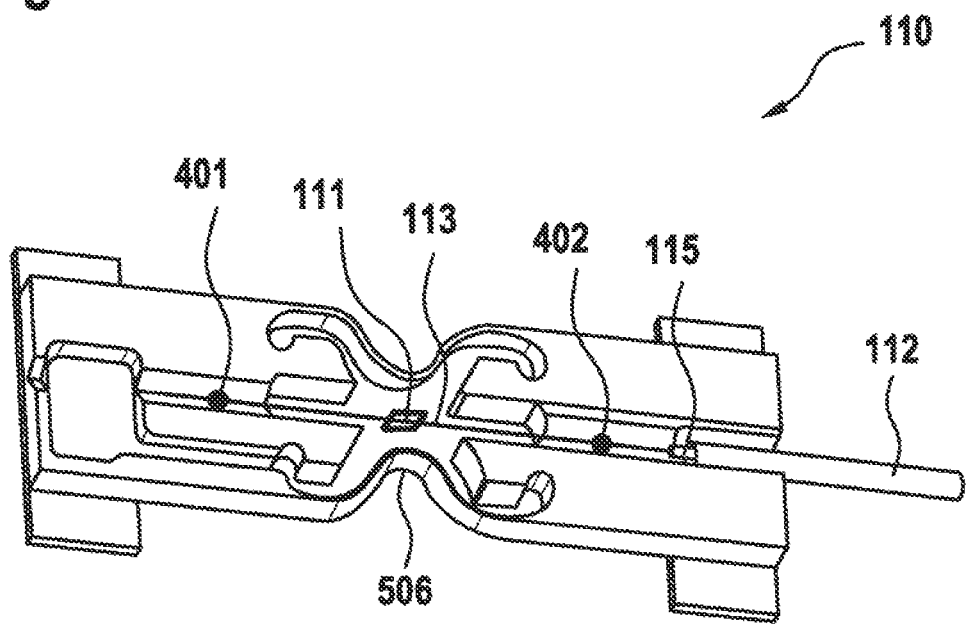
FIG. 3A schematically shows parts of a clamping device for a light guide in a perspective view at an oblique angle from above.
Figure 3B:
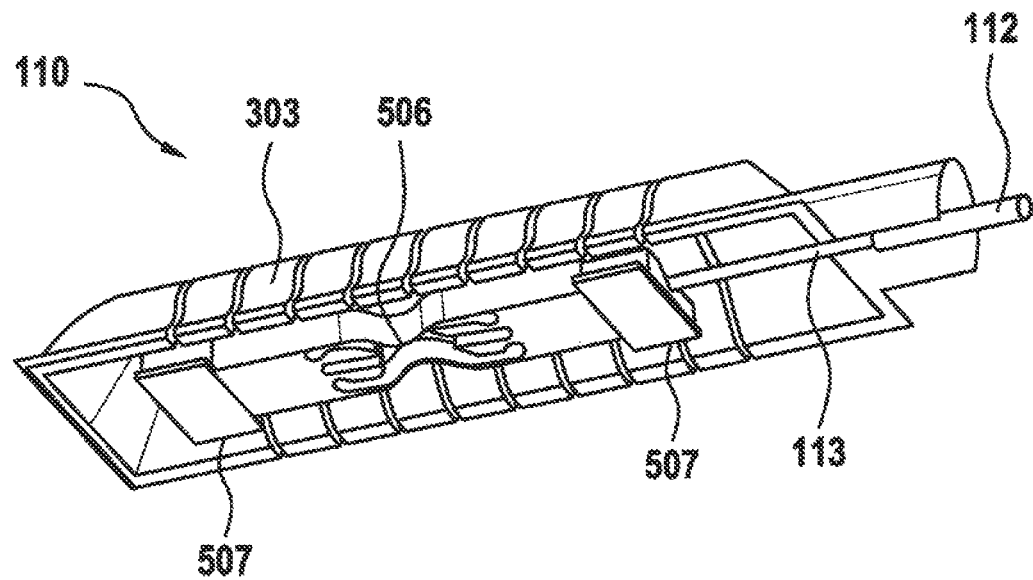
FIG. 3B schematically shows parts of a clamping device for a light guide with an attached covering element and an inserted light guide in a perspective view at an oblique angle from below.

FIGS. 3A and 3B show further views of parts of a fiber optic sensor 110 from different angles of view for clarifying a typical embodiment. FIG. 3A schematically shows a carrier structure for a light guide 112 in a perspective view at an oblique angle from above, and FIG. 3B schematically shows a carrier structure for a light guide 112 with an attached covering element 303 and an inserted light guide 112 in a perspective view at an oblique angle from below, that is from the side where the measurement object is mounted when the sensor is in operation. The provision of the covering element 303 achieves the advantage that the fiber optic sensor 110 as well as the carrier structure are protected against damage. According to an embodiment, the carrier structure is provided between an intermediate carrier (not shown in FIGS. 3A and 3B) and the covering element 303. Thus, the mounted covering element 303 offers protection against external force effects, in particular a step protection. According to a further embodiment which can be combined with embodiments described herein, a layer of soft rubber is further applied to the covering element 303 for protecting the fiber optic sensor 110 against environmental influences.

The light guide 112 includes a light guide core 113 including the sensor element 111 formed, for instance as a fiber Bragg grating, and a light guide sheath 115. According to embodiments which can be combined with other embodiments described herein, the carrier structure further includes at least one elastic element 506 arranged between the first and second securing elements 301, 302 and configured to pretension a light guide 112 secured to the securing elements 301, 302 or the first and second positions 401, 402 in its longitudinal direction. As illustrated in FIG. 3A, the carrier structure may include the elastic element 506. Thus, it is possible to detect fiber compressions apart from fiber elongations by means of optical signals. In other words, the advantage is achieved that the elastic element 506 pretensions a fiber Bragg grating attached to the carrier structure in such a manner that the grating detects both elongations and compressions. Due to the achieved pretensioning of the light guide 112 together with the fiber optic sensor element 111, it is therefore possible to detect positive and negative elongations. The pretensioning of the optical sensor fiber moreover enables a state to be detected, in which a fiber is broken or has detached from the securing points 401, 402 at one or both of the securing elements 301, 302. Such a pretensioning of the light guide 122 accordingly enables in a beneficial manner both elongation and detaching of the light guide 112 from a securing element 301, 302 to be detected.

According to further embodiments which can be combined with embodiments described herein, the carrier structure may be realized in one piece together with the elastic element 506.

As illustrated in FIG. 3B, the carrier structure includes surfaces 507, i.e. connecting surfaces to the intermediate carrier 500, that can be attached to the intermediate carrier 500. Such an attachment may be an adhesive connection or a soldered connection, for example. The surfaces 507 coincide with the first and second securing positions 501, 502 shown in FIG. 1.

Figure 4:
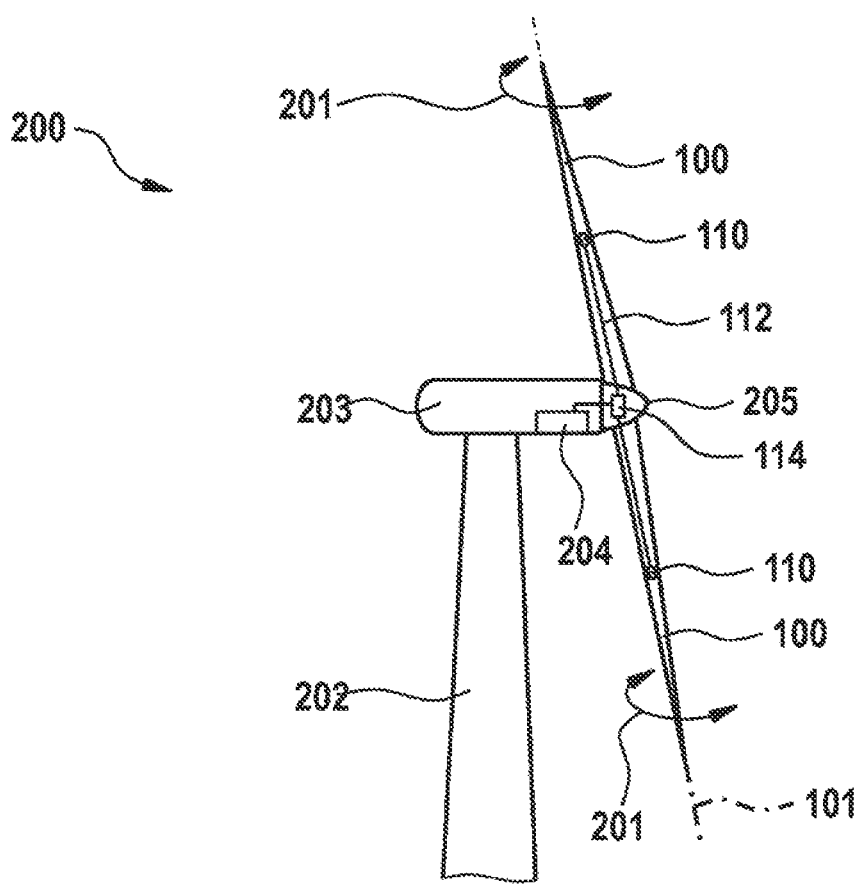
FIG. 4 schematically shows a part of a wind turbine including rotor blades and fiber optic sensors secured thereto.

FIG. 4 shows a wind turbine 200. The wind turbine 200 includes a tower 202 and a nacelle 203. The rotor 500 is attached to the nacelle 203. The rotor 500 includes a hub 205, where the rotor blades 100 are fastened. According to typical embodiments, the rotor 500 has at least two rotor blades, in particular three rotor blades. In the operation of the wind energy plant or wind turbine, the rotor 500, i.e. the hub 205 with the rotor blades 100, rotates about an axis. Thereby, a generator is driven for power generation. In order to employ a fiber optic sensor 110 for instance in a wind turbine, the fiber optic sensor 110 as shown in FIGS. 3A and 3B, for example, may be provided on a rotor blade 100, in particular in an outer radial area thereof. In this case, it is advantageous for the fiber optic sensor 110 to have a small dimension in a cross-section perpendicular to the light guide 112 in FIG. 1. A maximum dimension in a cross-section perpendicular to the axis of the light guide 112 may be 10 mm or less, for example. The configuration as shown with reference to FIG. 1 enables such a dimensioning to be easily realized.

As illustrated in FIG. 4, at least one fiber optic sensor 110 is provided on a rotor blade 100. Via a signal line or a light guide 112, the sensor 110 is in communication with an evaluating unit 114. The evaluating unit 114, for instance delivers a signal to a control unit 204 of the wind turbine 200.

Here, for the use in rotor blades of wind turbines or for the methods for monitoring wind turbines, for example, it is particularly beneficial for an elongation and/or compression to be measured in a direction perpendicular to the longitudinal extension of the light guide 112. Wind turbines are subject to a complex control necessitated by varying operating conditions, for example. In the monitoring of operating states of wind turbines, a plurality of sensors is used. For example, elongation and/or compression measurements on a rotor blade 100 may be performed for measuring the bending of the rotor blade 100.

Due to the conditions linked to the operation of a wind turbine, for example pressure and temperature variations, weather and meteorological conditions, but also in particular strongly changing wind conditions, and due to the multiplicity of statutory safety measures, the monitoring and the sensors required for monitoring are subject to a multiplicity of marginal conditions. A pressure variation might, for instance occur at the rotor blades 100 during operation. Here, an instability along the rotor blade axis 101 might occur which disturbs the operation of the wind turbine and reduces the energy yield. Further, there is the possibility that a change of pressure and thus vibrations or oscillations arise in single rotor blades. This leads to critical operating states in many cases, requiring complex control and/or regulating measures. An elongation and/or compression measurement directly on the rotor blade furthermore enables a setting of a pitch angle to be found that is efficient to the energy yield.

Each rotor blade 100 may have its own individual elongation and/or compression distribution. Therefore, at least one fiber optic sensor 110 is provided in each rotor blade 100 according to certain embodiments which can be combined with other embodiments.

According to some embodiments described herein which can be combined with embodiments, fiber optic sensors 110, in which a signal is optically transmitted via a light guide 112, enable a radial mounting position, that was hitherto regarded in practice as being unfavorable, along a longitudinal extension of the rotor blade 100, since the transmission by means of a light guide 112 or optical fiber entails a reduced risk of lightning damage. Fiber optic sensors 110 may therefore be provided in such a manner to allow an assembly in an outer radial area 107 of a rotor blade 110 without increasing the risk of lightning damage.

Figure 5:
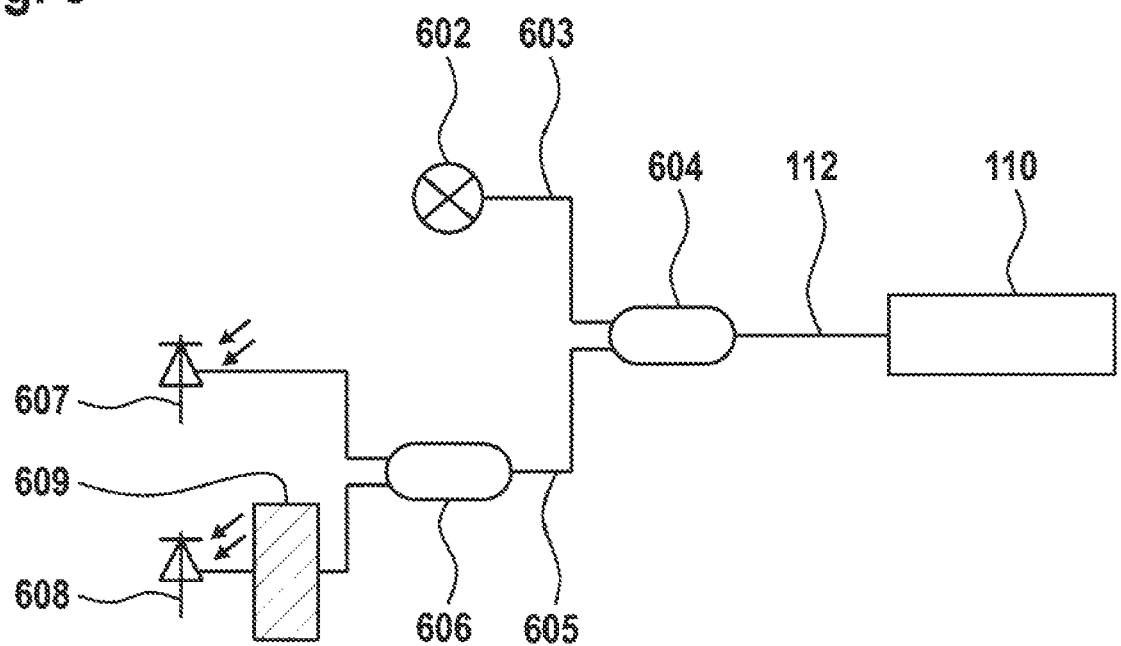
FIG. 5 schematically shows a measuring setup for a fiber optic sensor according to embodiments described herein.

FIG. 5 shows a typical measuring system for the fiber optic elongation and/or compression measurement according to the embodiments described herein. The system includes one or more fiber optic sensors 110. The system includes a source 602 of electromagnetic radiation, for example a primary source of light. The source 602 serves to provide optical radiation by which at least one fiber optic sensor 110 can be irradiated. For this purpose, an optical transmission fiber or a light guide 603 is provided between the primary source of light 602 and a first fiber coupler 604. The fiber coupler 604 couples the primary light into the optical fiber or the light guide 112. The source 602 may be, for instance, a broadband source of light, a laser, an LED (light emitting diode), an SLD (super luminescence diode), an ASE source of light (amplified spontaneous emission source of light) or an SOA (semiconductor optical amplifier). Even a plurality of sources of the same or different type (see above) may be used for the embodiments described here.

The sensor element 111 such as, for example, an optical fiber Bragg grating is optically coupled to the sensor fiber 112. The light reflected from the fiber optic sensors 110 will in turn be guided via the fiber coupler 604, which guides the light via the transmission fiber 605 into a beam splitter 606. The beam splitter 606 splits the reflected light for detection by means of a first detector 607 and a second detector 608. On this occasion, the signal detected on the second detector 608 is firstly filtered by an optical filtering means 609. Due to the filtering means 609, a wavelength distribution of an optical signal output from the sensor element 111 can be analyzed.

Generally, a measuring system as illustrated in FIG. 5 may be provided without the beam splitter 606 or the detector 607. The detector 607, however, enables the measurement signal of the fiber optic sensor 110 to be standardized with respect to other intensity fluctuations such as, for example, fluctuations in the intensity of the source 602, fluctuations by reflections on interfaces between individual light guides, fluctuations by reflection on interfaces between the light guide 112 and the evaluating unit 114, or other intensity fluctuations. This standardization improves the measuring accuracy and reduces during the operation of the measuring system a dependence on the length of the light guide 112 provided between the evaluating unit 114 and the fiber optic sensor 110.

The optical filtering means 609 or additional optical filtering means for filtering the optical reflection signal output from the sensor element 111 may includes an optical filter which is selected from the group consisting of an edge filter, a thin film filter, a fiber Bragg grating, an LPG, an arrayed waveguide grating (AWG), an echelle grating, an array of gratings, a prism, an interferometer, and any combination thereof.

Figure 6:
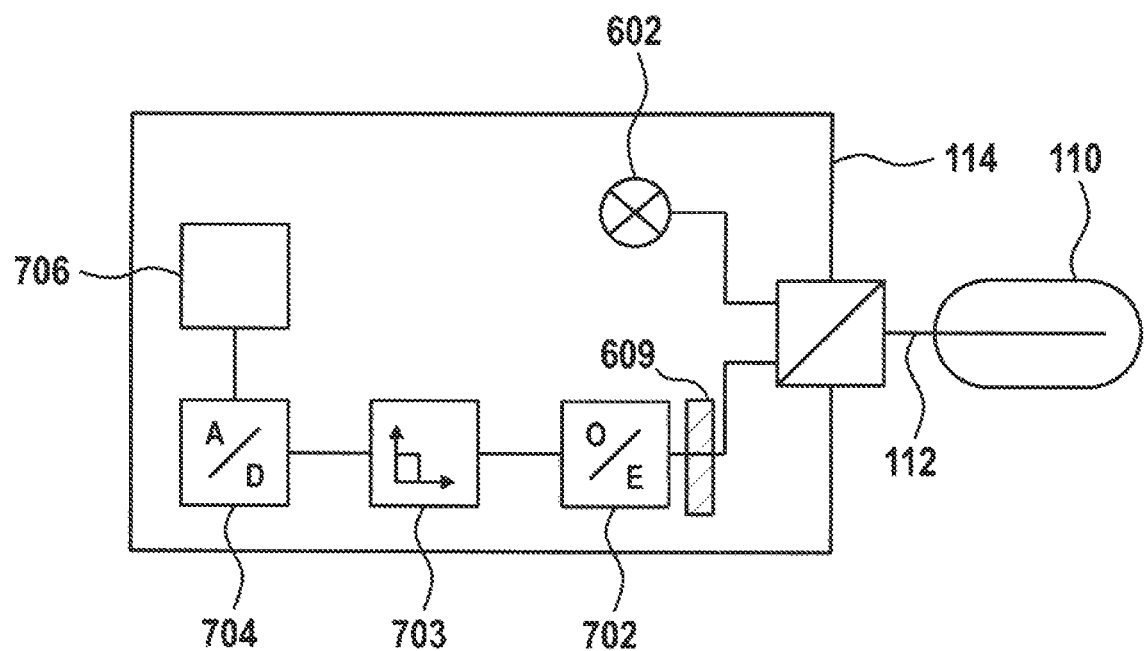
FIG. 6 schematically shows a measuring setup for a fiber optic sensor according to embodiments described herein.

FIG. 6 shows an evaluating unit 114, wherein a signal of a fiber optic sensor 110 is guided via a light guide 112 to the evaluating unit 114. Furthermore, a source of light 602 is illustrated in FIG. 6, which may be optionally provided in the evaluating unit. The source of light 602, however, may even be provided independently or external to the evaluating unit 114. The optical signal of the fiber optic sensor 110 is converted into an electrical signal by a detector, i.e. an opto-electrical converter 702. The electrical signal is filtered by an analog anti-aliasing filter 703. Following the analog filtering by the analog anti-aliasing filter or low-pass filter 703, the signal is digitized by an analog-to-digital converter 704.

According to some embodiments described here which can be combined with other embodiments, the evaluating unit 114 enables elongations and/or compressions of a measurement object, to which the intermediate carrier 500 of the clamping device 300 is mounted, to be identified based on the reflection signal output from the fiber optic sensor element 111. The anti-aliasing filter can have a critical frequency of 1 kHz or below, in particular of 500 Hz or below, furthermore in particular of 100 Hz or below. According to embodiments described here, such a filtering takes place prior to digitizing. According to embodiments described here, an analog low-pass filtering takes place prior to digitizing a signal of a fiber optic sensor 110. According to embodiments described here, which can be combined with other embodiments the low-pass filter may also be referred to as an analog anti-aliasing filter. Hereby, the Nyquist frequency is considered within a sampling theorem, and a low-pass filtering with signal portions smaller than the Nyquist frequency is provided by means of the analog low-pass filter or analog anti-aliasing filter. Based on the embodiments described here including a fiber optic sensor 110 and an analog low-pass filtering, an improved measurement of elongations and/or compressions of a measurement object may be provided. FIG. 6 furthermore shows a digital evaluating unit 706, which may include, for instance, a CPU, memories and other elements for digital data processing.

As explained with respect to FIG. 6, a method for elongation and/or compression detection by means of the fiber optic sensor 110 can be improved. An evaluating unit 114 is provided, for example. The evaluating unit 114 may include a converter for converting the optical signal into an electrical signal. For example, a photodiode, a photomultiplier (PM) or any other opto-electronic detector may be used as the converter. The evaluating unit 114 moreover includes an anti-aliasing filter 703 which is connected to the output of the converter or the opto-electronic detector, for example. The evaluating unit 114 may furthermore include an analog-to-digital converter 704 which is connected to the output of the anti-aliasing filter 703. The evaluating unit 114 may moreover include a digital evaluating unit 706 which is arranged to evaluate the digitized signals.

According to even further embodiments which can be combined with the embodiments described herein, a temperature compensation in the fiber optic sensor 110 can be provided such that materials having a very low thermal expansion coefficient are used for the intermediate carrier 500 and/or the securing elements 301, 302.

According to embodiments, the light guide 112 may, for example, be a glass fiber, an optical fiber or a polymer conductor, wherein materials such as optical polymers, polymethyl methyl acrylate, polycarbonate, quartz glass, ethylene tetrafluoroethylene can be used which are doped, if need be. The optical fiber may in particular be realized as an SMF-28 fiber.

Figure 7:
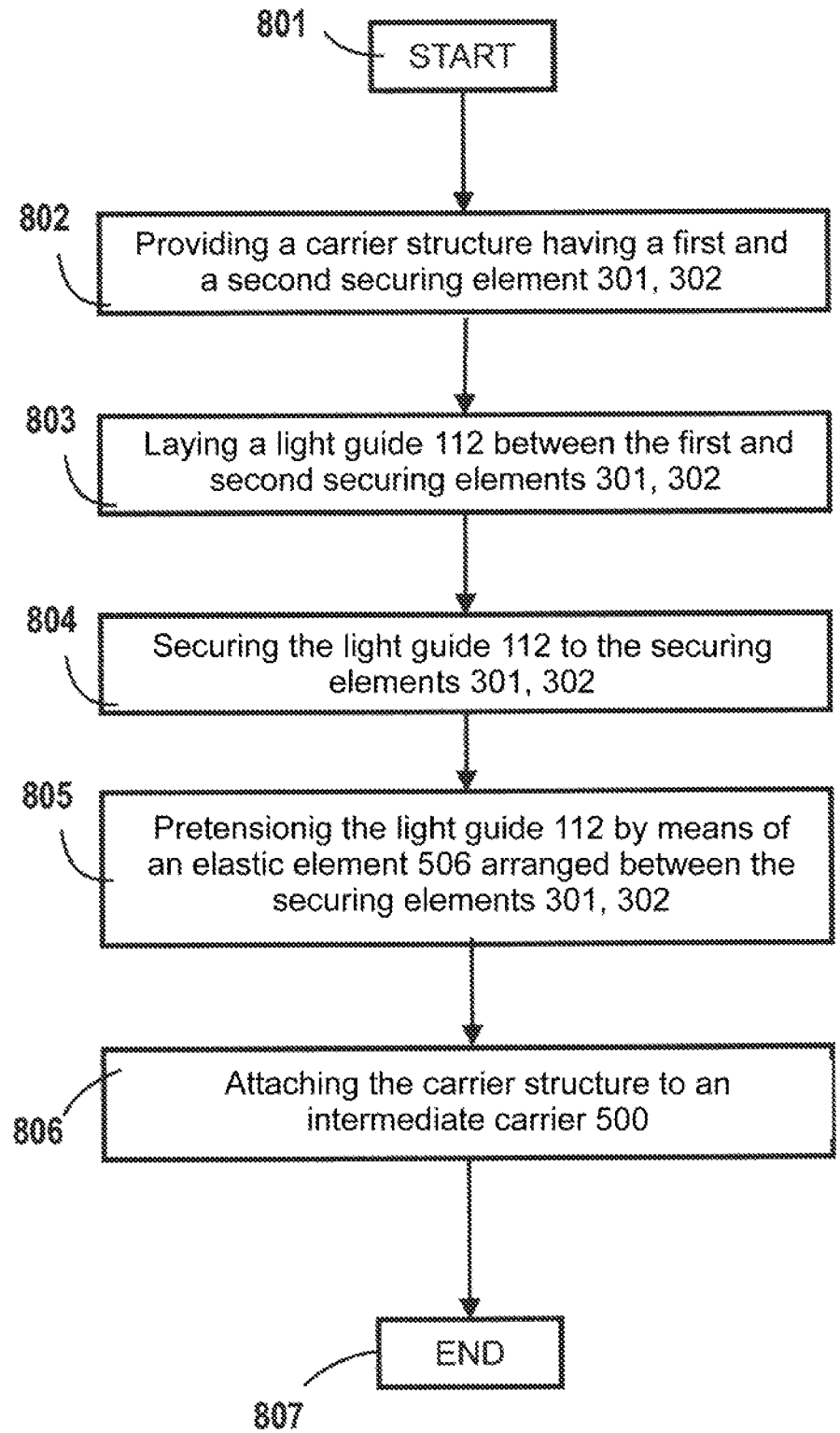
FIG. 7 shows a flow chart for illustrating a method for producing a sensor for measuring elongations and/or compressions of a measurement object to be monitored, according to embodiments described herein.

FIG. 7 shows a flowchart for illustrating a method for producing a fiber optic sensor 110 for measuring elongations and/or compressions of a measurement object to be monitored, according to embodiments described here. In detail, the method for producing the sensor 110 includes the following blocks 801 to 807. The production procedure is started in a block 801. Subsequently, in a block 802, a carrier structure having a first and a second securing element 301, 302 is provided. In a following block 803, a light guide 112 is laid between the first and second securing elements 301, 302, for example, by inserting it in dedicated grooves on the securing elements 301, 302. Finally, the light guide 112 is secured to the securing elements 301, 302 (block 804).

The light guide 112 can now be pretensioned by means of an elastic element 506 arranged between the securing elements 301, 302, see block 805. After attaching the carrier structure to an intermediate carrier 500 in a block 806, the production procedure is ended in block 807.

A fiber optic sensor 110 for measuring elongations and/or compressions of a measurement object to be monitored is thus provided. The sensor 110 includes a light guide 112 with a fiber Bragg grating 111, wherein the light guide 112 is clamped in a clamping device 300. The clamping device 300, in turn, includes a carrier structure having a first securing element 301 for securing the light guide 112 in a first position 401 and a second securing element 302 at a distance from the first securing element 301 for securing the light guide 112 in a second position 402, wherein the first and second positions 401, 402 have a first distance 403 in a longitudinal extension of the light guide 112. Furthermore, an intermediate carrier 500 is provided having a first surface 503, on which the first and second securing elements 301, 302 are attached in respective securing positions 501, 502, and having an opposing second surface 504, which can be applied to a measurement object. In this case, a second distance 505 of the securing positions 501, 502 of the securing elements 301, 302 on the intermediate carrier 500 is greater than the first distance 403 in the longitudinal direction of the light guide 112.

Further applications of the fiber optic sensor 110 exist in the field of vibration measurement. By detecting elongations and compressions, for example, airborne vibrations and structure-borne vibrations become detectable. Such vibrations, that can be detected by the fiber optic sensor 110 according to embodiments described herein, can have frequencies in a range of 1 kHz or higher, typically in a range of 5 kHz or higher.

Although the present invention has been described above on the basis of typical embodiments, it is not restricted thereto, but can be modified in manifold ways. The invention is neither restricted to the mentioned possible applications.

The invention claimed is:

1. A clamping device for a light guide, comprising:
    a carrier structure having:
        a first securing element for securing the light guide in a first position, and
        a second securing element at a distance from the first securing element for securing the light guide in a second position,
        wherein the first and second positions have a first distance in a longitudinal extension of the light guide; and
    an intermediate carrier having:
        a first surface on which the first and the second securing elements are attached in respective securing positions, and
        an opposing second surface, which can be applied to a measurement object,
        wherein a second distance of the securing positions of the securing elements on the intermediate carrier is greater than the first distance in a longitudinal direction of the light guide,
    wherein the clamping device is configured to pretension a fiber Bragg grating attached to the carrier structure in such a manner that the fiber Bragg grating detects both elongations and compressions, and
    wherein the securing elements together with the intermediate carrier form a converter structure having a mechanical signal amplification arrangement that is free from lever action and which is configured so that a relative change in length ($\varepsilon$) applied to the fiber Bragg grating is greater than the relative change in length (E) applied to the intermediate carrier.

2. The clamping device according to claim 1, wherein the carrier structure further comprises at least one elastic element arranged between the first and second securing elements, the at least one elastic element configured to pretension the light guide secured to the securing elements in the longitudinal direction.

3. The clamping device according to claim 1, wherein the carrier structure is configured to receive the light guide, wherein the fiber Bragg grating is a fiber Bragg grating of the light guide, and the fiber Bragg grating is positioned between the securing elements.

4. The clamping device according to claim 1, wherein the carrier structure is realized from a metallic material.

5. The clamping device according to claim 1, wherein the intermediate carrier is realized from steel, aluminum, CFRP, GFRP or plastics.

6. The clamping device according to claim 1, wherein the first distance, the second distance, a material of the carrier structure and a material of the intermediate carrier are selected such that a passive temperature compensation is provided for a fiber optic sensor secured to the carrier structure.

7. The clamping device according to claim 6, wherein the thermal expansion coefficient of the carrier structure and the thermal expansion coefficient of the intermediate carrier are configured such that the passive temperature compensation is provided for the fiber optic sensor secured to the carrier structure.

8. The clamping device according to claim 2, wherein the elastic element is configured to pretension the fiber Bragg grating attached to the carrier structure in such a manner that the grating detects both elongations and compressions.

9. The clamping device according to claim 1, wherein at least one of the securing elements has a recess for inserting and fixing the light guide.

10. The clamping device according to claim 2, wherein the carrier structure is realized in one piece together with the elastic element.

11. A sensor for measuring elongations and/or compressions of a measurement object to be monitored, comprising:
a light guide; and
a clamping device for the light guide comprising:
a carrier structure having:
a first securing element for securing the light guide in a first position;
a second securing element at a first distance from the first securing element for securing the light guide in a second position, wherein the first and second positions have a first distance is in a longitudinal extension of the light guide; and
an intermediate carrier having
a first surface on which the first and second securing elements are attached in respective securing positions, and
an opposing second surface, which can be applied to a measurement object,
wherein a second distance of the securing positions of the securing elements on the intermediate carrier is greater than the first distance in a longitudinal direction of the light guide,
wherein the clamping device is configured to pretension a fiber Bragg grating attached to the carrier structure in such a manner that the fiber Bragg grating detects both elongations and compressions,
the light guide having the fiber Bragg grating, and
wherein the securing elements together with the intermediate carrier form a converter structure having a mechanical signal amplification arrangement that is free from lever action and which is configured so that a relative change in length ($\varepsilon$) applied to the fiber Bragg grating is greater than the relative change in length (E) applied to the intermediate carrier.

12. The sensor according to claim 11, further comprising:
a covering element, wherein the carrier structure is provided between the intermediate carrier and the covering element.

13. The sensor according to claim 11, wherein the carrier structure further comprises at least one elastic element arranged between the first and second securing elements, the at least one elastic element comprising configured to pretension the light guide secured to the securing elements in the longitudinal direction.

14. The sensor according to claim 11, wherein the carrier structure is configured to receive the light guide which has the fiber Bragg grating that can be positioned between the securing elements.

15. A method for producing a sensor for measuring elongations and/or compressions of a measurement object to be monitored, comprising:
providing a carrier structure having a first and a second securing element;
laying a light guide between the first and the second securing elements, the light guide including a sensor element;
securing the light guide to the securing elements;
pretensioning the light guide by means of an elastic element arranged between the securing elements; and
attaching the carrier structure to an intermediate carrier,
wherein the securing elements together with the intermediate carrier form a converter structure having a mechanical signal amplification arrangement that is free from lever action and which is configured so that a relative change in length ($\varepsilon$) applied to the sensor element is greater than the relative change in length (E) applied to the intermediate carrier.

16. The method according to claim 15, wherein the light guide is adhesively bonded to the securing elements.

17. The method according to claim 15, wherein the attaching of the carrier structure to the intermediate carrier and/or mounting of the intermediate carrier to the measurement object to be monitored is performed by adhering, soldering, bonding or laser welding.

18. The method according to claim 15, wherein the pretensioning of the light guide provides for detecting compression and/or for detecting that the light guide is detached from a securing element.

19. The method according to claim 15, wherein a thermal expansion of the intermediate carrier is at least in part compensated by a thermal expansion of the carrier structure.

* * * * *